United States Patent
Fang

(10) Patent No.: US 7,103,063 B2
(45) Date of Patent: Sep. 5, 2006

(54) APPARATUS AND METHOD FOR FACILITATING DATA PACKET TRANSPORTATION

(75) Inventor: Rong C. Fang, Reston, VA (US)

(73) Assignee: Tellabs Reston, Inc., Reston, VA (US)

( * ) Notice: Subject to any disclaimer, the term of this patent is extended or adjusted under 35 U.S.C. 154(b) by 783 days.

(21) Appl. No.: 09/935,781

(22) Filed: Aug. 24, 2001

(65) Prior Publication Data

US 2002/0027928 A1 Mar. 7, 2002

Related U.S. Application Data

(60) Provisional application No. 60/227,521, filed on Aug. 24, 2000.

(51) Int. Cl.
*H04L 12/42* (2006.01)
*H04J 3/16* (2006.01)

(52) U.S. Cl. ...................... 370/452; 370/468
(58) Field of Classification Search ................ 370/468, 370/231, 232, 233, 395.21, 395.41, 447, 370/452, 455, 461
See application file for complete search history.

(56) References Cited

U.S. PATENT DOCUMENTS

| | | | | | |
|---|---|---|---|---|---|
| 4,726,018 | A | * | 2/1988 | Bux et al. ................ | 370/455 |
| 4,817,088 | A | * | 3/1989 | Adams ..................... | 370/402 |
| 5,164,938 | A | * | 11/1992 | Jurkevich et al. ........ | 370/231 |
| 5,245,605 | A | * | 9/1993 | Ofek ....................... | 370/447 |
| 5,636,212 | A | * | 6/1997 | Ikeda ...................... | 370/233 |
| 5,696,764 | A | * | 12/1997 | Soumiya et al. ......... | 370/395.41 |
| 5,768,271 | A | * | 6/1998 | Seid et al. ............... | 370/389 |
| 5,949,789 | A | * | 9/1999 | Davis et al. ............. | 370/452 |
| 6,104,714 | A | * | 8/2000 | Baudelot et al. ......... | 370/396 |
| 6,314,103 | B1 | * | 11/2001 | Medhat et al. ........... | 370/395.2 |
| 6,574,224 | B1 | * | 6/2003 | Brueckheimer et al. . | 370/395.6 |
| 6,788,681 | B1 | * | 9/2004 | Hurren et al. ........... | 370/389 |
| 2005/0058136 | A1 | * | 3/2005 | Lothberg et al. ........ | 370/395.3 |
| 2005/0201387 | A1 | * | 9/2005 | Willis ..................... | 370/395.52 |

OTHER PUBLICATIONS

Synchronous Optical Network (SONET) Transport Systems: Common Generic Criteria, Telecordia Technologies, GR-253-CORE, Issue 3, pp. 1-11 (Sep. 2000).

Giroux, N. et al., "Queuing and Scheduling," Quality of Service in ATM networks, Chapter 5, pp. 92-95.

Part 3: Carrier sense multiple access with collision detection (CSMA/CD) access method and physical layer specifications, IEEE Std. 802.3, pp. 36-40 (1998).

Smith, Philip, "Frame Relay Principals and Applications," pp. 130-134 (1993).

* cited by examiner

*Primary Examiner*—Frank Duong
*Assistant Examiner*—Kevin Mew
(74) *Attorney, Agent, or Firm*—Baker Botts L.L.P.

(57) ABSTRACT

A system that facilitate data packet transportation includes multiplexing time-sensitive TDM (Time Division Multiplexed) and other synchronous data, and asynchronous data traffic, onto a communication channel in a manner that minimizes jitter in the delivery of the TDM data traffic while efficiently transporting asynchronous data traffic. The system may also include dynamic bandwidth sharing on a communication ring. The dynamic sharing aspect of the system facilitates the efficient utilization of bandwidth of communication rings, particularly in those rings that cover large geographic areas.

28 Claims, 12 Drawing Sheets

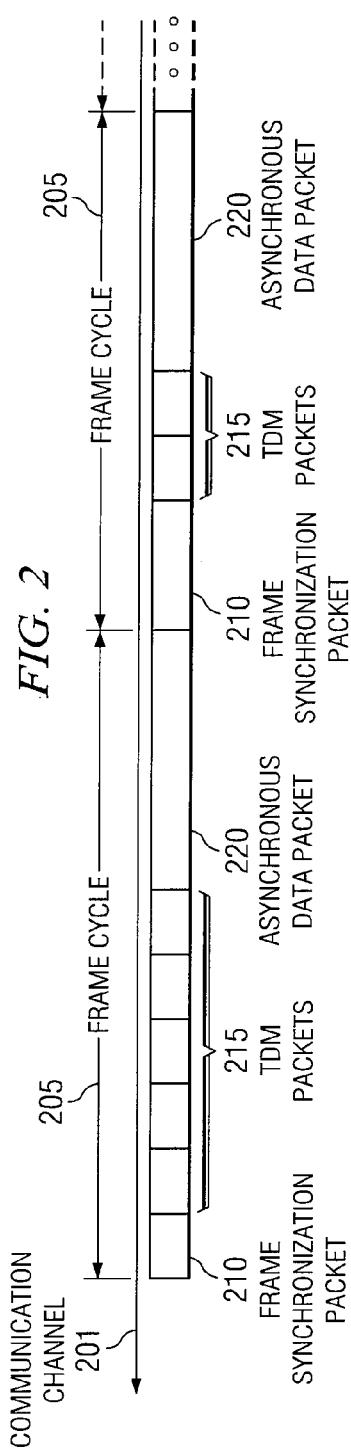

APPARATUS AND METHOD FOR FACILITATING DATA PACKET TRANSPORTATION

This application claims priority under 35 U.S.C. 119(e) to provisional application No. 60/227,521, filed Aug. 24, 2000, the entirety of which is incorporated herein by reference.

BACKGROUND OF THE INVENTION

The present invention generally relates to packet-based switching systems, and more particularly to apparatuses and methods for facilitating the transportation of data packets.

DESCRIPTION OF THE RELEVANT ART

While packet switching systems are well known in the art, such systems may not be able to efficiently use communication channels under congested conditions or when combinations of synchronous and asynchronous data must be transported.

A variety of techniques are known in the art for multiplexing synchronous and asynchronous data onto communication channels. The efficient transmission of combinations of asynchronous data and synchronous data, while limiting jitter to acceptable levels, however, has proven to be difficult for traditional multiplexing schemes. In addition, many applications that use synchronous data require that the synchronous data arrive at precisely timed intervals with minimal jitter.

Communication systems commonly employ a variety of topologies, including ring, bus, and star configurations. In some topologies, such as the ring and bus, communication nodes access a shared communication facility, i.e., the ring or bus, which has a maximum bandwidth (capacity) for carrying traffic. While the average amount of traffic generated by the communication nodes on a particular communication facility may be less than the maximum bandwidth of the facility, the traffic generated by the communication nodes at particular times may exceed the maximum bandwidth. Since the communication facility cannot carry more traffic than the maximum bandwidth, some method must determine when the communication facility is being loaded at levels near its maximum bandwidth, i.e., becoming congested, and must limit the traffic generated by the communication nodes to prevent the communication facility from becoming overloaded. A number of such methods are known in the art, but may not be suitable for use on ring-based communication systems that cover large geographic areas due to time delays, or may otherwise introduce significant inefficiencies in the operation of the communication network.

SUMMARY OF THE INVENTION

Embodiments of the present invention described and shown in the specification, claims, and drawings facilitate the multiplexing of synchronous and asynchronous data onto communication channels, and the dynamic sharing of bandwidth on ring-based communication channels.

An object of the present invention is to efficiently transport synchronous data with limited jitter over a communication channel while making the remaining available bandwidth of the channel available for the transport of asynchronous data. A further object of the present invention is to provide congestion management for ring-based communication systems. Advantages of the present invention are that jitter is limited, multiplexing and demultiplexing of synchronous data is simplified, and otherwise unused bandwidth is made available for the transport of asynchronous data. A further advantage of the present invention is that high-priority traffic being transported on ring-based communication channels may be assigned sufficient bandwidth for transmission on the ring even during periods of congestion, while other traffic is efficiently provided with ring bandwidth as it becomes available.

Some embodiments of the present invention inject a timing synchronization signal into a communication channel to facilitate the minimization of jitter and the transportation of asynchronous data, and to simplify the multiplexing and demultiplexing of synchronous data. The timing synchronization signal is injected into the data stream on the communication channel at fixed time intervals and is used to regulate the timing of all synchronous data, including Time Division Multiplex data ("TDM"), and asynchronous data transportation on the channel. In some embodiments, the timing synchronization signal is carried in a fixed-length frame synch packet with a unique frame code that is transported unscrambled in order to reduce the time needed to re-synchronize to the timing synchronization signal.

In some embodiments of the present invention, the synchronous data, including TDM data, is transported in a synchronous data packet with the payload length of the synchronous data packet being indicated by a length indication byte in the header of the packet. In some embodiments, synchronous data packets from a particular synchronous input channel will be injected into the communication channel at a particular, fixed, predetermined time in relation to the timing packet. This predetermined time is assigned to the synchronous input channel during service provisioning time and may be adjusted as additional synchronous input channels are provisioned.

In some embodiments of the present invention, the bandwidth on the communication channel that is not reserved for synchronous data and the timing synchronization signal is provisioned as a single sub-channel for asynchronous (including High Level Data Link Control (HDLC)) data packets. The incoming asynchronous data stream is packetized and inserted into the sub-channel at those time intervals that are not reserved for synchronous data or the timing synchronization signal.

Some embodiments of the present invention, related to communication rings, assign a baseline amount of bandwidth (the "subscription" bandwidth) and an Acceptable Over-Subscription Bandwidth to each communication node on a communication ring. The maximum amount of ring bandwidth that a node is permitted to use at any particular time, in addition to the node's baseline subscription bandwidth, is the node's Access Bandwidth. The actual ring bandwidth available to a node at any particular time, in addition to the node's baseline subscription bandwidth, is the node's actual Over-Subscription Bandwidth. For each node, if the amount of over-subscription bandwidth available on the ring is less than the Acceptable Over-Subscription Bandwidth and the node's over-subscription traffic that is ready to be sent to the ring requires more than the node's actual Over-Subscription Bandwidth, then an access congestion indication will be sent to the rest of the nodes on the ring.

Further, a Maximum Over-Subscription bandwidth is also assigned to each communication node. Each node will not send more over-subscription traffic than the Maximum Over-Subscription Bandwidth. The Maximum Over-Subscription Bandwidth of particular nodes is set at the service provisioning time, as is known in the art, based on factors including the traffic types and number of customers, thus providing access fairness for each node and minimizing the effect of location-dependent advantages.

Further, if access congestion occurs, then a node's Access Bandwidth is limited to less than the node's Maximum Over-Subscription Bandwidth. The node's Access Bandwidth is adjusted based on factors including the node's location, how long the congestion exists, and the Maximum Over-Subscription Bandwidth assigned to the node. The smallest Access Bandwidth assigned to a node is equal to the Acceptable Over-Subscription Bandwidth of that node. If the congestion terminates, then the Access Bandwidth of each node is adjusted upward up to the Maximum Over-Subscription Bandwidth assigned to the node. The amount by which the Access Bandwidth of a node is adjusted downward or upward during a particular time interval is randomized with regard to the other nodes to prevent traffic synchronization.

Additional objects and advantages of the invention are set forth in part in the description which follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

In the accompanying drawings:

FIG. 2 is a timing diagram depicting an embodiment of the present invention for multiplexing synchronous and asynchronous data onto a communication channel.

FIG. 4 is a diagram depicting an embodiment of a Frame Synchronization Packet format of the present invention.

FIG. 5 is a diagram depicting an embodiment of a TDM Packet format of the present invention.

FIG. 6 is a diagram depicting an embodiment of an Asynchronous Data Packet format of the present invention.

DETAILED DESCRIPTION

Interpretation of Terms

Figure 1:
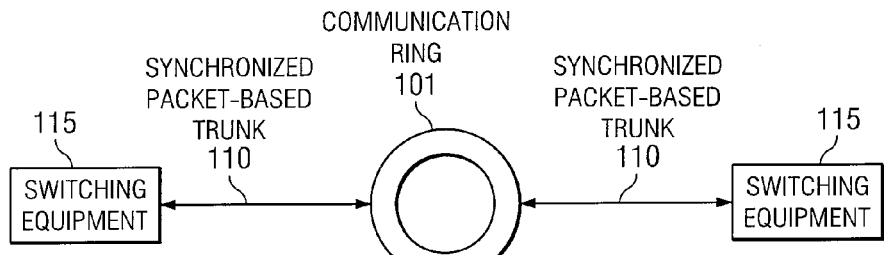
FIG. 1 is a diagram depicting an embodiment of the present invention for facilitating data packet transportation.

Unless otherwise noted in this specification or in the claims, all of the terms used in the specification and the claims will have the meanings normally ascribed to these terms by workers in the art. Certain terms specifically comprise the meanings associated with them as follows:

"Computer system" refers to individual standalone computers, multiple computers coupled in any manner, and software simulations of computers regardless of the intended use of the computer system or the technology used to implement the computer system. The term "Computer system" includes, but is not limited to, packet-switching systems and other communication switching systems.

"Frame Cycle" refers to the time period on a communication channel beginning with the start of the transmission of a Frame Synchronization Packet and ending with the start of the transmission of the next subsequent Frame Synchronization Packet on that communication channel. In some embodiments of the present invention depicted in FIG. 2, Communication Channel 201 transports a sequence of data packets, where the data packets are depicted as traveling from right to left through Communication Channel 201, starting with Frame Synchronization Packet 210 and continuing with TDM Packets 215 and Asynchronous Data Packet 220. The sequence then repeats, starting again with Frame Synchronization Packet 210. Frame Cycle 205 begins at the start of Frame Synchronization Packet 210 and ends at the start of the next subsequent Frame Synchronization Packet 210. As is known in the art, if Communication Channel 201 transports data at a particular bit rate, for example, 56,000 bits per second ("56 kbps"), then a known number of bits can be transported during a Frame Cycle 205. For example, at a bit rate of 56 kbps and a Frame Cycle 205 duration of one millisecond, 56 bits (or 7 bytes, given that eight bits equal one byte) can be transported during Frame Cycle 205. In some embodiments, during particular frame cycles, no synchronous data may be available for transport and thus no TDM Packets would be transported during such a frame cycle. Similarly, in some embodiments and during particular frame cycles, no asynchronous data may be available for transport and thus no Asynchronous Data Packets would be transported during such a frame cycle.

"Frame Synchronization Packet" refers to a data packet of the present invention for identifying the start of a Frame Cycle. The Frame Synchronization Packet may also be used to transport Operation, Administration, and Maintenance (OAM) data as is known in the art. FIG. 4 depicts an embodiment of the format of a Frame Synchronization Packet. In some embodiments, the Frame Synchronization Packet starts with a unique frame code, composed of two bytes, F1 401 and F2 402, for identifying the beginning of a Frame Cycle. The length of the packet is fixed. In the embodiment depicted in FIG. 4, the payload length, which does not include the frame code, is 14 bytes. As is known in the art, other payload lengths may be employed. Frame code bytes F1 401 and F2 402 are framing bytes that indicate the beginning of a frame, e.g. a 125 microsecond (us) frame. F1 401 and F2 402 are not scrambled, but the rest of bytes in the Frame Synchronization Packet are scrambled in some embodiments for increased efficiency as is known in the art. The pattern of F1 401 and F2 402 shown in FIG. 4 is an example and other patterns may be used as are known in the art. In the embodiment depicted in FIG. 4, Byte-1 403 and Byte-2 404 indicate the number of bytes directly following this Frame Synchronization Packet that will be occupied by TDM Packets on the communication channel transporting the Frame Synchronization Packet. In some embodiments, this number is calculated from the number of TDM Packets provisioned on the communication channel during service provisioning time as is known in the art. In other embodiments, the number of bytes that will be occupied by TDM Packets is calculated from the TDM Packets that are actually queued for transport on the communication channel following the Frame Synchronization Packet. Other methods for calculating the number of bytes, as are known in the art, may also be employed. In the preferred embodiment depicted in FIG. 4, Byte-3 405 and Byte-4 406 indicate the failed nodes on a 16-node ring comprising the communication channel as is known in the art. Byte-3 405 and Byte-4 406 may be used for other purposes as are known in the art. In this embodiment, the rest of the packet is used for OAMP (Operation, Administration, Maintenance, and Provisioning) bytes 407, including a check sum for the payload as is known in the art.

"TDM Packet" refers to a data packet of the present invention for transporting TDM traffic. FIG. 5 depicts an embodiment of the format of a TDM packet. The depicted TDM packet has two overhead bytes (Byte-1 501 and Byte-2 502), and fixed length TDM payload 503 whose length depends on the type of TDM traffic to be carried. In some embodiments, Byte-1 501 is a service identification byte used to indicate the type of TDM traffic carried by the packet, e.g. DS1, VT1, DS3, STS1, or STSn, as are known in the art. In some embodiments, Byte-2 502 contains OAMP messages for the traffic carried in TDM payload 503, as is known in the art. When Byte-1 501 is a service identification byte, and the length of the Frame Cycle is known, the length of the TDM payload is determined as is known in the art. For example, in a 125 us Frame Cycle:

For 64 Kilobits per second (Kb/s): 1 byte
For 384 Kb/s: 6 bytes
For DS1: 24 bytes with the 193rd bit stored in Byte 2 (in some embodiments)
For DS3/STS1: 810 bytes
For STSn: n×810 bytes "Asynchronous Data Packet" refers to a data packet of the present invention for carrying asynchronous data. FIG. 6 depicts an embodiment of an Asynchronous Data Packet format which uses the same format as the HDLC frame format, as is known in the art, so that an HDLC frame can be transported within a Frame Cycle without any conversion. In this embodiment, an Asynchronous Frame Packet comprises leading HDLC Flag 601, Asynchronous Data Bytes 602, and trailing HDLC Flag 603, with leading HDLC Flag 601 and trailing HDLC Flag 603 each occupying one byte. In some embodiments of the present invention, the remaining transport capacity of a particular Frame Cycle can be calculated, as is known in the art, based on the known length of the Frame Cycle, the size of the Frame Synchronization Packet, and the size and number of TDM Packets to be carried during the Frame Cycle. The number of asynchronous data bytes to be carried in an Asynchronous Data Packet is then adjusted so that the Asynchronous Data Packet occupies the remaining transport capacity of the Frame Cycle. In some embodiments, an HDLC frame may be larger than the usual sizes of Asynchronous Data Packets on a particular communication channel employing the present invention. Such large HDLC frames may be split into two or more segments, with each segment being carried by a separate Asynchronous Data Packet and reassembled after all the component segments are received, as described below in this Specification.

"Subscription Bandwidth" refers, for a communication ring, to the amount of bandwidth guaranteed to be reserved on the communication ring for all of subscription traffic of that ring's nodes. Similarly, Subscription Bandwidth refers, for a particular node on a communication ring, to the amount of bandwidth guaranteed to be reserved on the communication ring for that node's subscription traffic, as is known in the art. A particular node's Subscription Bandwidth is not generally shared with other nodes on the communication ring.

"Over-Subscription Bandwidth" refers, for a communication ring, to the amount of bandwidth available after the Subscription Bandwidth for that ring is subtracted from the ring's total available bandwidth. The nodes of a communication ring generally share the ring's Over-Subscription Bandwidth as needed to transport each node's over-subscription traffic, as is known in the art.

"Maximum Over-Subscription Bandwidth" refers, for a particular node on a communication ring, to the maximum amount of Over-Subscription Bandwidth that the node may be permitted to use. In some embodiments of the present invention, the Maximum Over-Subscription Bandwidth of a particular node is set at the service provisioning time, as is known in the art, based on factors including the traffic types and number of customers, to provide access fairness for each node and minimize the effect of location-dependent advantages.

"Acceptable Over-Subscription Bandwidth" refers, for a particular node on a communication ring, to the minimum amount of Over-Subscription Bandwidth that may be made available for the node to use. Due to Congestion or other problems on the ring, as are known in the art, however, the Over-Subscription Bandwidth actually available to a node at a particular time may be less than the node's Acceptable Over-Subscription Bandwidth. In some embodiments of the present invention, the Acceptable Over-Subscription Bandwidth of a particular node is set at the service provisioning time, as is known in the art, based on factors including the traffic types and number of customers, to provide access fairness for each node and minimize the effect of location-dependent advantages.

"Access Bandwidth" refers, for a particular node on a communication ring, to the actual maximum Over-Subscription Bandwidth assigned to the node at a particular time. Access Bandwidth will never be higher than the node's Maximum Over-Subscription Bandwidth and will never be lower than the node's Acceptable Over-Subscription Bandwidth but the Over-Subscription Bandwidth actually available to the node at a particular time may be less than the Access Bandwidth due to Congestion or other ring problems, as are known in the art.

"actual Over-Subscription Bandwidth" refers, for a particular node on a communication ring, to the smaller of the node's Access Bandwidth and the over-subscription bandwidth that is actually available to the node from the ring at a particular time. Thus, actual Over-Subscription Bandwidth is never larger than the node's Access Bandwidth, but may be reduced below the node's Access Bandwidth due to conditions on the ring. The actual Over-Subscription Bandwidth is the maximum ring bandwidth that a node will use.

"Congestion" refers, for a particular node on a communication ring, to a condition where the node has more over-subscription traffic to send to the ring than can be absorbed by the actual Over-Subscription Bandwidth available to the node, and the amount of actual Over-Subscription Bandwidth available to the node is less than the node's Acceptable Over-Subscription Bandwidth. Congestion is cleared when the node has less over-subscription traffic to send to the ring than can be absorbed by the actual Over-Subscription Bandwidth available to the node, or the amount of actual Over-Subscription Bandwidth available to the node is equal to or greater than the node's Acceptable Over-Subscription Bandwidth.

Detailed Description

Acts performed by methods, systems, and apparatus functions of the present invention may be implemented, as is known in the art, as software running on general purpose computers or special purpose computers, as hardware, or as combinations of software and hardware.

In some embodiments of the present invention, as depicted in FIG. 1, Switching Equipment 115, as is known in the art, operates on data packets for internal communication. For the transmission of data packets through communication channels, such as Communication Ring 101, an aspect of the present invention, Synchronized Packet-Based Trunk 110, is employed. To facilitate the use of communication channels such as the Communication Ring 101, the dynamic bandwidth sharing aspect of the present invention is employed in conjunction with Communication Ring 101.

1. Synchronized Packet-Based Trunk

Embodiments of the present invention for multiplexing synchronous and asynchronous data onto communication channels employ three different packet formats for transporting timing/OAM data, synchronous data (including TDM data), and asynchronous data. The Frame Synchronization Packet format is used for transporting timing and OAM information, the TDM Packet format is used for transporting synchronous data, and the Asynchronous Data Packet format is used for transporting asynchronous data. In some embodiments, bandwidth for either TDM Packets or Asynchronous Data Packets can be automatically allocated. In various embodiments, a communication channel may be used to transport timing/OAM data and synchronous data; timing/OAM data and asynchronous data; or timing/OAM data, synchronous data, and asynchronous data.

Embodiments of the present invention inject a timing synchronization signal into a communication channel to facilitate the minimization of jitter and the transportation of asynchronous data, and to simplify the multiplexing and demultiplexing of synchronous data. The timing synchronization signal is injected into the data stream on the communication channel at fixed time intervals and is used to regulate the timing of all synchronous data transportation on the channel. In an embodiment of the present invention, the timing synchronization signal is carried in a fixed-length Frame Synchronization Packet with a unique frame code that is unscrambled in order to reduce the time needed to re-synchronize to the timing synchronization signal, as is known in the art.

In some embodiments of the present invention, synchronous data, including TDM data, is transported in a TDM Packet with the payload length of the TDM Packet being indicated by a length indication byte in the header of the packet. In some embodiments, data packets received from a particular synchronous input channel are injected into the communication channel at a particular, fixed, predetermined time in the Frame Cycle in relation to the Frame Synchronization Packet. This predetermined time is assigned to the synchronous input channel during service provisioning time and may be adjusted as additional synchronous input channels are provisioned.

In embodiments of the present invention, the portion of the Frame Cycle that is not reserved for synchronous data and the Frame Synchronization Packet is provisioned as a single channel for asynchronous (HDLC) data packets. In these embodiments, an incoming asynchronous data stream is packetized and inserted into the channel at those time intervals in the Frame Cycle that are not reserved for synchronous data or the Frame Synchronization Packet.

In some embodiments, and as described below in more detail, the scheduler for transmitting TDM Packets and Asynchronous Data Packets employs a directory which contains a priority indication for each packet and also contains a pointer to the storage location of each packet. The use of a directory with priority and location information improves the efficiency with which packets can be selected for transport. In some embodiments, a pointer to the next packet to be transmitted is stored in a communication register in the scheduler. This communication register is accessed by an output processor that uses the pointer to locate the next packet for transmission. The output processor then transmits the packet at the line rate of the communication channel.

In some embodiments, the scheduler keeps track of the number of available bytes that can be transmitted after the Frame Synchronization Packet and all of the TDM Packets of a Frame Cycle have been transmitted, and before the Frame Synchronization Packet for the next Frame Cycle must be transmitted. In some embodiments, the count of the number of available bytes is used to size an Asynchronous Data Packet for transporting asynchronous data. Any asynchronous HDLC data that cannot be sent completely during a particular Frame Cycle is divided and transmitted partially in the particular Frame Cycle and partially in the next following Frame Cycles. Thus, Asynchronous Data Packets employing the HDLC protocol for asynchronous data may not contain complete HDLC packets. In some embodiments, a decoding processor that receives the Asynchronous Data Packets detects partial HDLC-based packets and buffers the HDLC data packet contents until the entire HDLC packet is received during subsequent Frame Cycles.

Figure 3:
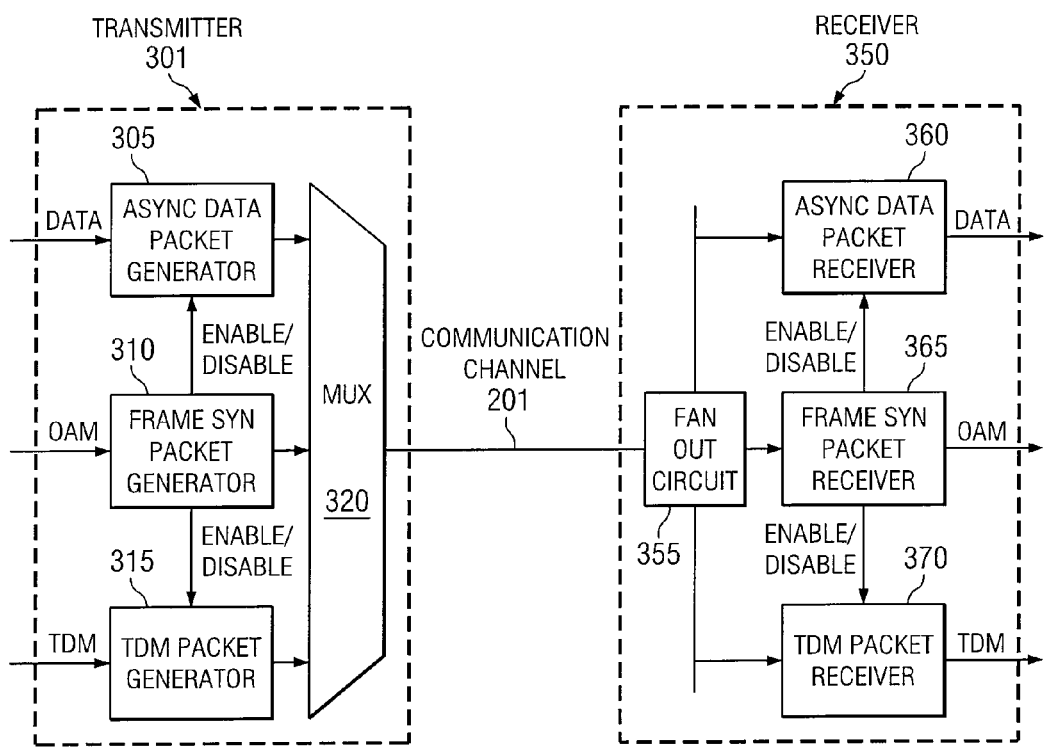
FIG. 3 is a block diagram depicting an embodiment of a Trunk Transmitter and Receiver of the present invention

FIG. 3 is a block diagram depicting an embodiment the transmission and reception of Frame Synchronization ("syn") Packets, Asynchronous Data Packets and TDM Packets. At Transmitter 301, Frame syn packet generator 310 transmits a Frame Synchronization Packet first, then enables TDM packet generator 315, and then finally enables the Async data packet generator 305. MUX 320 multiplexes the outputs of Frame syn packet generator 310, TDM packet generator 315, and Async data packet generator 305 onto Communication Channel 201. At Receiver 350, FAN Out circuit 355 receives packets from Communication Channel 201 and distributes the packets for processing by Frame syn packet receiver 365, TDM packet receiver 370, and Asyc data packet receiver 360. Frame syn packet receiver 365 first detects the Frame Synchronization Packet, then enables TDM packet receiver 370, and finally enables Async data packet receiver 360.

Figure 7:
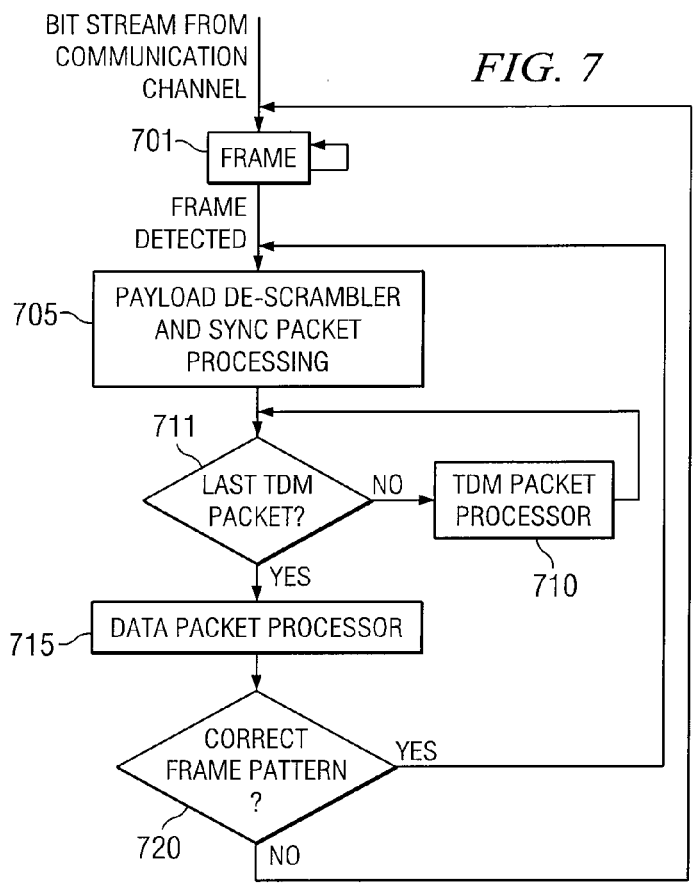
FIG. 7 is a block diagram depicting the reception, decoding, and processing of packets in an embodiment of the present invention.

FIG. 7 depicts a flow chart that describes, in some embodiments, the reception, decoding, and processing of received packets. Framer 701 monitors, as is known in the art, the bit stream from a communication channel and attempts to detect the unique frame code carried, in some embodiments, in Frame Synchronization Packets. When the frame code is detected, control is passed to Payload De-Scrambler and Sync Packet Processing 705 for processing of the Frame Synchronization Packets and recovery of the TDM Packets. TDM Packets are processed by TDM Packet Processor 710 until Last TDM Packet? 711 determines that all TDM Packets in the current Frame Cycle have been processed. Control is then passed to Data Packet Processor 715 for processing of any Asynchronous Data Packets. After Data Packet Processor 715 completes processing, Correct frame pattern ? 720 determines if the frame code for the next Frame Cycle has been detected. If the frame code is detected, then control returns to Payload De-Scrambler and Sync Packet Processing 705, and processing continues as described above. If the frame code is not detected, then control returns to Framer 701, and Framer 701 continues to search for the frame code.

Figure 8:
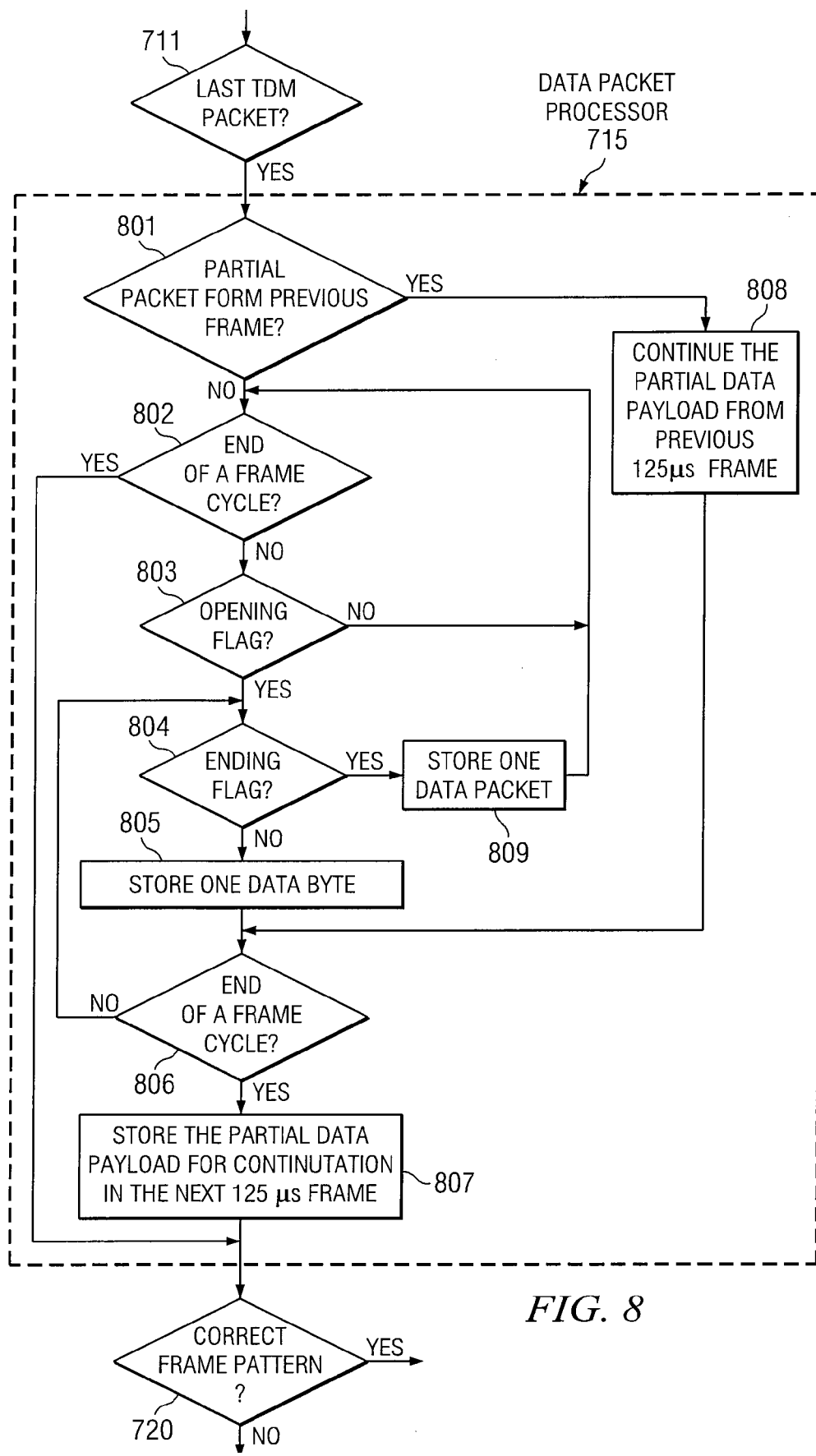
FIG. 8 is a flow chart depicting the operation of a Data Packet Processor in an embodiment of the present invention.

FIG. 8 depicts a flow chart that describes, for some embodiments, the operation of Data Packet Processor 715. Data Packet Processor 715 processes each byte received from the communication channel after the last TDM Packet is processed and until the expected end of the Frame Cycle is reached. Since Asynchronous Data Packets may contain partial HDLC frames, portions of Data Processor 715, particularly including Partial packet from previous frame? 801, Continue the partial data payload from previous 125 us frame 808, and Store the partial data payload for continuation in the next 125 us frame 807, deal with partial HDLC frames. Other portions of Data Processor 715 (802–806) generally deal with the processing of both full and partial HDLC frames.

Figure 9:
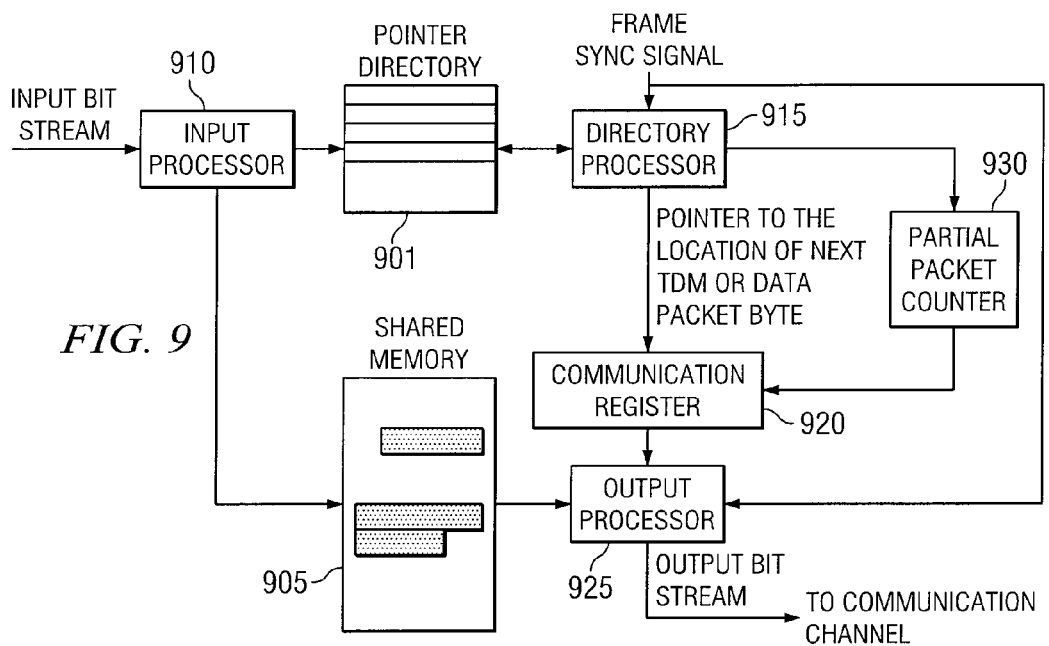
FIG. 9 is a block diagram depicting an embodiment of a Trunk Transmitter of the present invention.

FIG. 9 is a block diagram depicting, in some embodiments, the processing for transmission of Frame Synchronization Packets, TDM Packets and Asynchronous Data Packets. Input Processor 910 receives all packets from an Input bit stream, and, based on the type of packet and the priority assigned to the packet, stores each packet in Shared Memory 905, creates a pointer to each packet, and stores the pointers in Pointer Directory 901. Each pointer includes information on the associated stored packet including the length of the packet, the location of the packet in Shared Memory 905, and the priority of the packet. Shared Memory 905 also serves as an egress buffer for transmitting packets out to a communication channel through Output Processor 925. Directory Processor 915 is a scheduler that notifies Output Processor 925, through Communication Register 920, which packet to send out next onto the communication channel. Partial Packet Counter 930 is interposed between Directory Processor 915 and Communication Register 920.

In some embodiments, Pointer Directory 901 stores information concerning the location and priority of Frame Synchronization Packets, TDM Packets, and Asynchronous Data Packets to be transported by the communication channel. In some embodiments, the data structure in Pointer Directory 901 is organized based on the priority of the packets in order to reduce the search time, e.g. for a Frame Synchronization Packet which has the highest priority, the pointer to that packet may be placed at the beginning of the data structure so that the pointer is accessed first.

When a new packet arrives for transportation by the communication channel, a pointer for the packet is generated in Pointer Directory 901. After a packet is transported by the communication channel, the pointer associated with that packet is erased.

Figure 10:
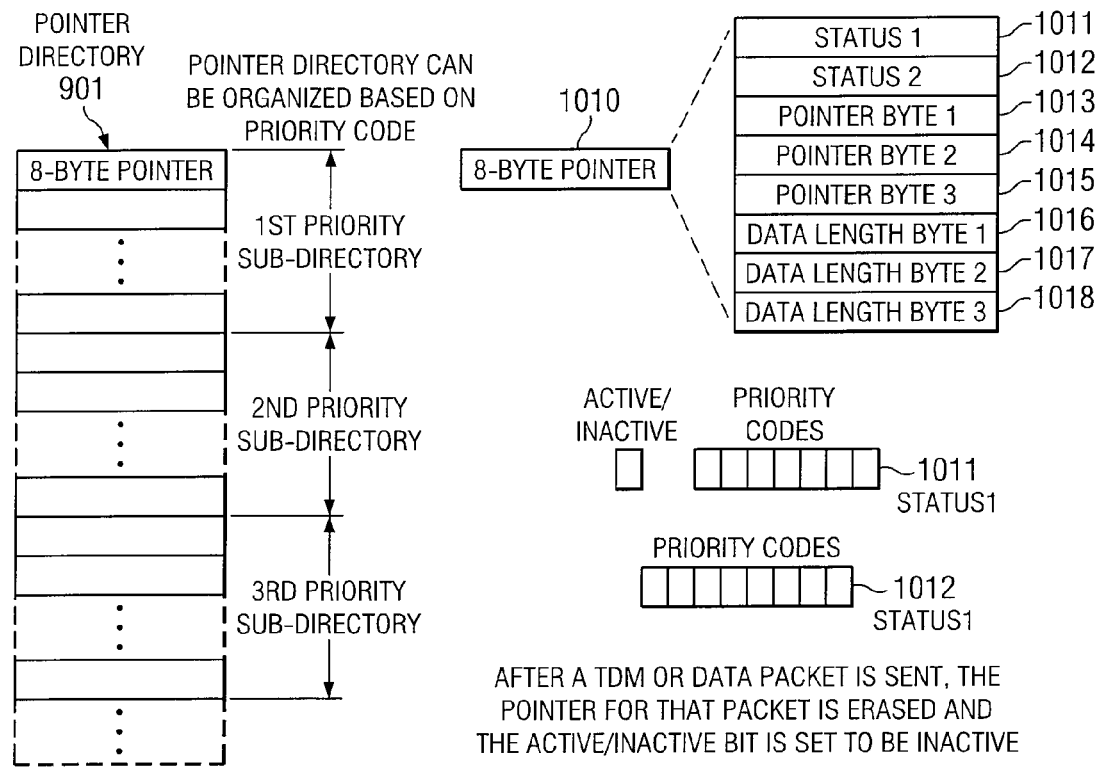
FIG. 10 is a diagram depicting a embodiment of the implementation of a Pointer Directory of the present invention.

FIG. 10 depicts, in some embodiments, an example of the information stored in a pointer. In this embodiment, 8-byte pointer 1010 comprises 8 bytes as follows: Status 1 1011 and Status 2 1012 are status bytes; Pointer Byte 1 1013, Pointer Byte 2 1014, and Pointer Byte 3 1015 identify the beginning address of a packet stored in the shared memory; and Data Length Byte 1 1016, Data Length Byte 2 1017, and Data Length Byte 3 1018 are used to identify the length of the packet. In some embodiments, Status 1 1011 and Status 2 1012 are also used to identify the priority of the packet.

Figure 11:
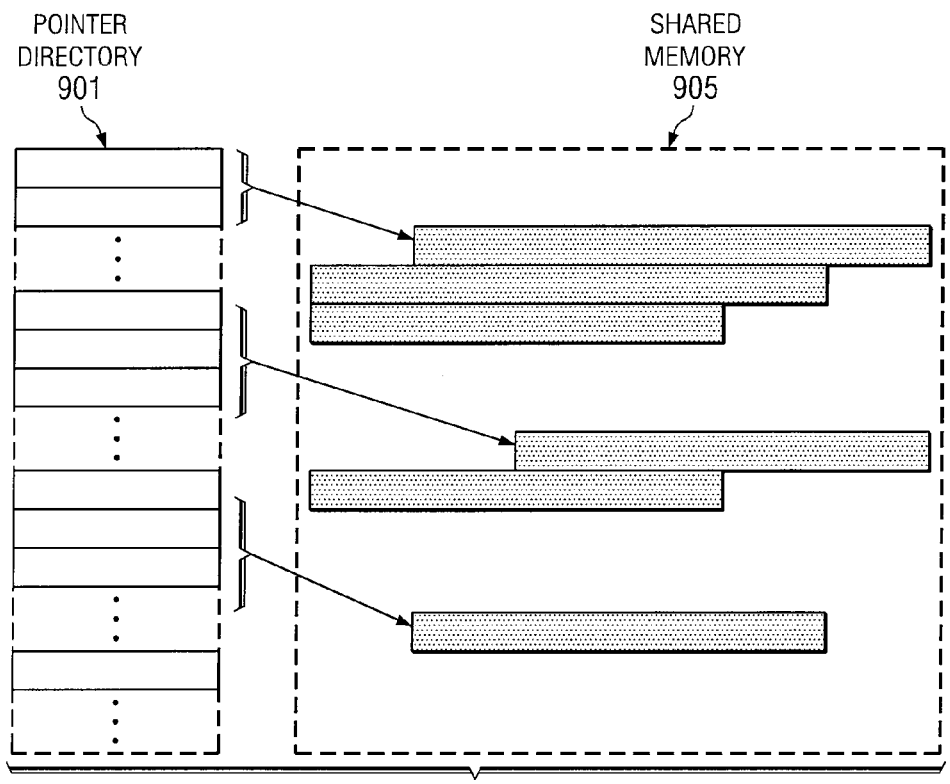
FIG. 11 is a diagram depicting the relationship between the Pointer Directory and Shared Memory in an embodiment of the present invention.

FIG. 11 depicts, in some embodiments, the relationship between Pointer Directory 901 and Shared Memory 905 where a pointer in Pointer Directory 901 point to the beginning of packets stored in Shared Memory 905. Since, in some embodiments, the amount of TDM traffic bytes to be carried over each Frame Cycle is known, Shared Memory 905 can be organized, as is known in the art, to reserve a memory area only for TDM traffic. The size of the memory area can be varied and reassigned during each new service provisioning time. In this memory area, no asynchronous data packets are stored, and thus, sufficient memory space to buffer the TDM traffic will be assured. A further benefit is that the time required to search Shared Memory 905 for TDM traffic will be reduced.

Figure 12:
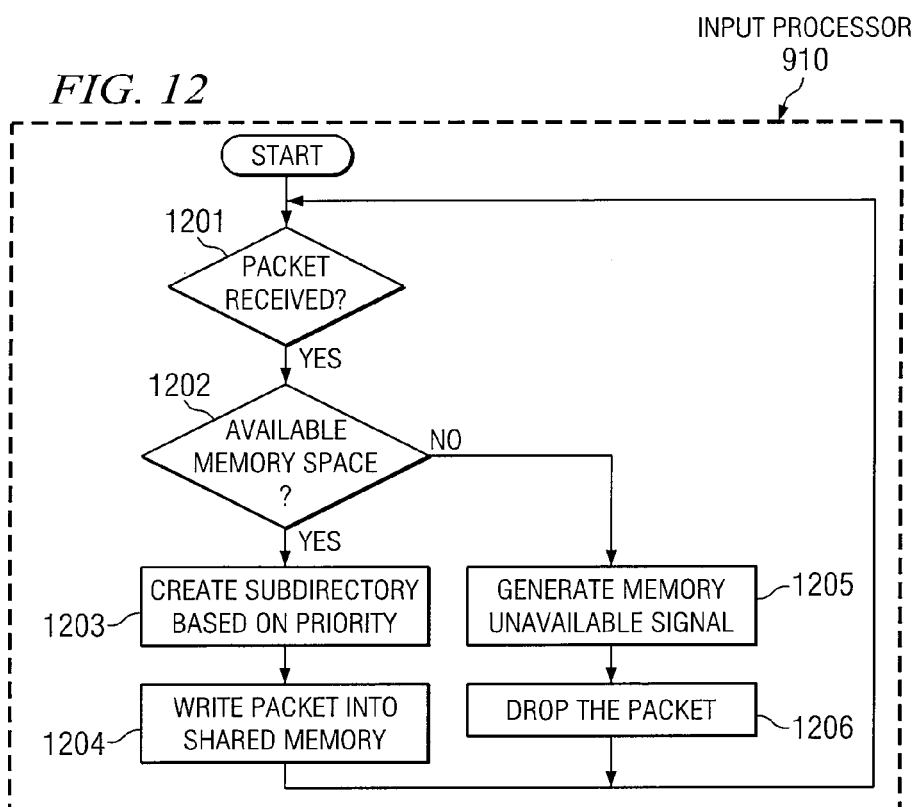
FIG. 12 is a flow chart depicting the operation of an Input Processor in an embodiment of the present invention.

FIG. 12 depicts a flowchart of a preferred embodiment of Input Processor 910 depicted in FIG. 9. As described in connection with FIGS. 10 and 11, Input Processor 910 generally receives packets and stores them in Shared Memory in subdirectories based on the priority of the packets. If Input Processor 910 does not have memory space available for a packet then the packet is discarded and a problem signal is generated by Generate memory unavailable signal 1205.

Figure 13:
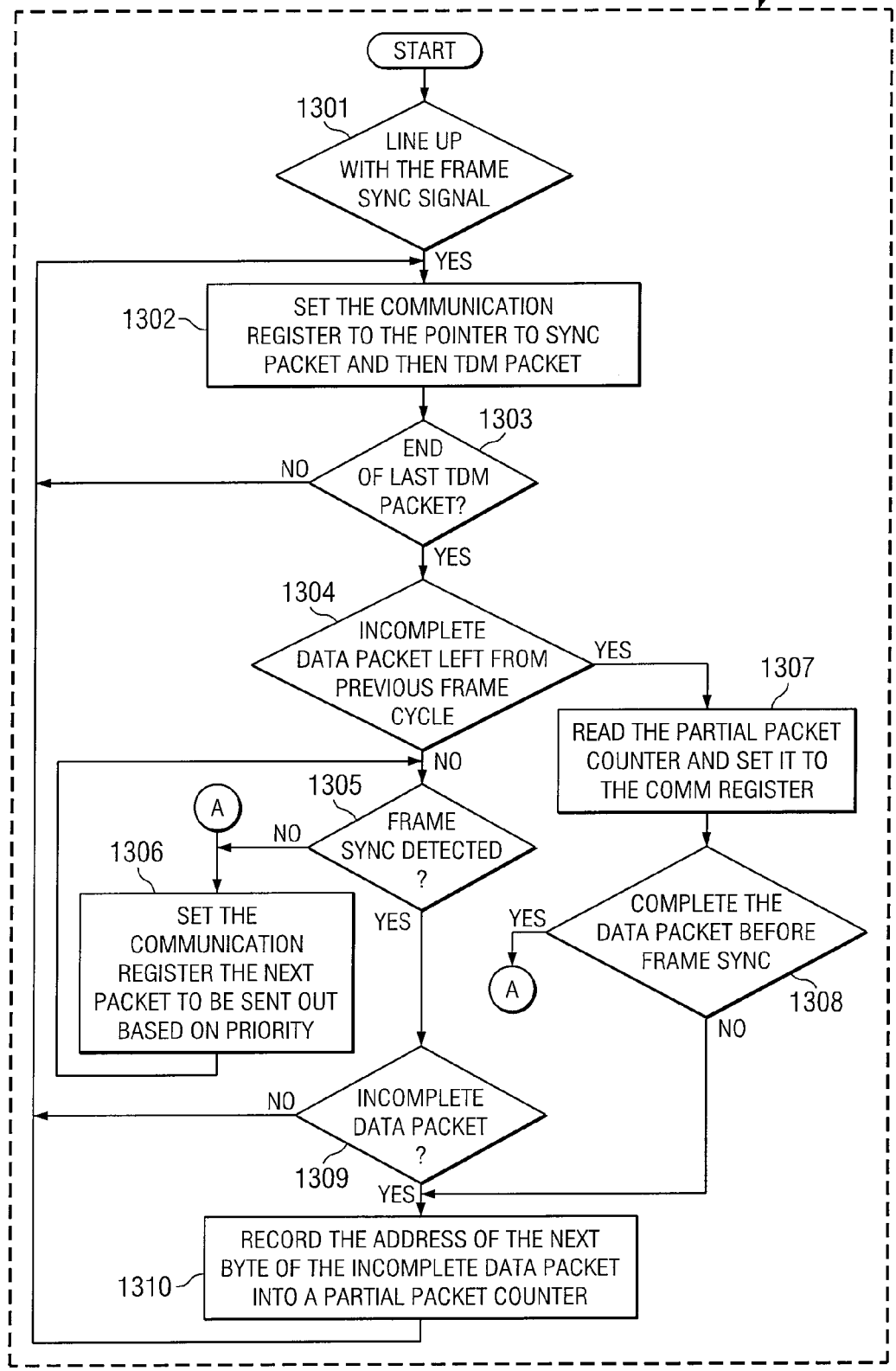
FIG. 13 is a flow chart depicting the operation of a Directory Processor in an embodiment of the present invention.

FIG. 13 depicts a flowchart of some embodiments of Directory Processor 915 depicted in FIG. 9. In the embodiments depicted in FIG. 13, Directory Processor 915 operates a scheduler and is able to send a partial HDLC frame as part of an Asynchronous Data Packet in one Frame Cycle and the rest of the HDLC frame as part of Asynchronous Data Packets in the next Frame Cycles. Directory Processor 915 uses a communication register to identify the next packet to be sent out by Output Processor 925 (depicted in FIG. 9).

Figure 14:
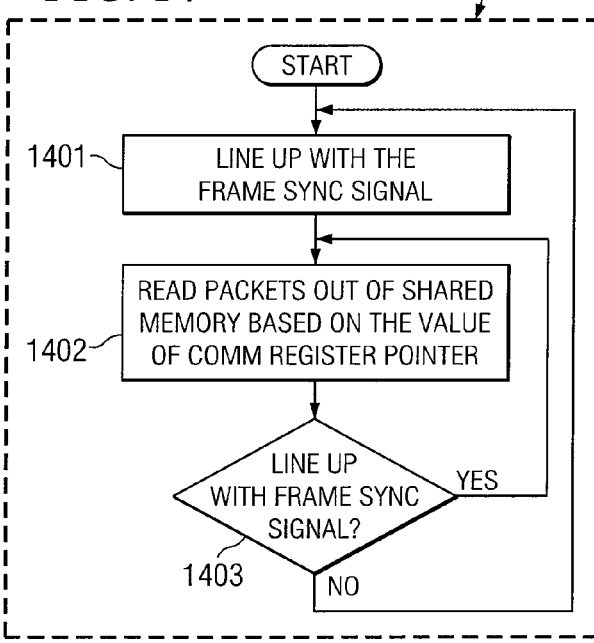
FIG. 14 is a flow chart depicting the operation of an Output Processor in an embodiment of the present invention.

FIG. 14 depicts a flowchart of some embodiments of Output Processor 925 depicted in FIG. 9. In this embodiment, Output Processor 925 synchronizes with a frame synchronization signal that controls the timing of the Frame Cycles as is known in the art. If Output Processor 925 successfully identifies the frame synchronization signal, then Output Processor 925 reads packets out of Shared Memory in response to the communication register.

2. Dynamic Bandwidth Sharing on a Communication Ring

Figure 15:
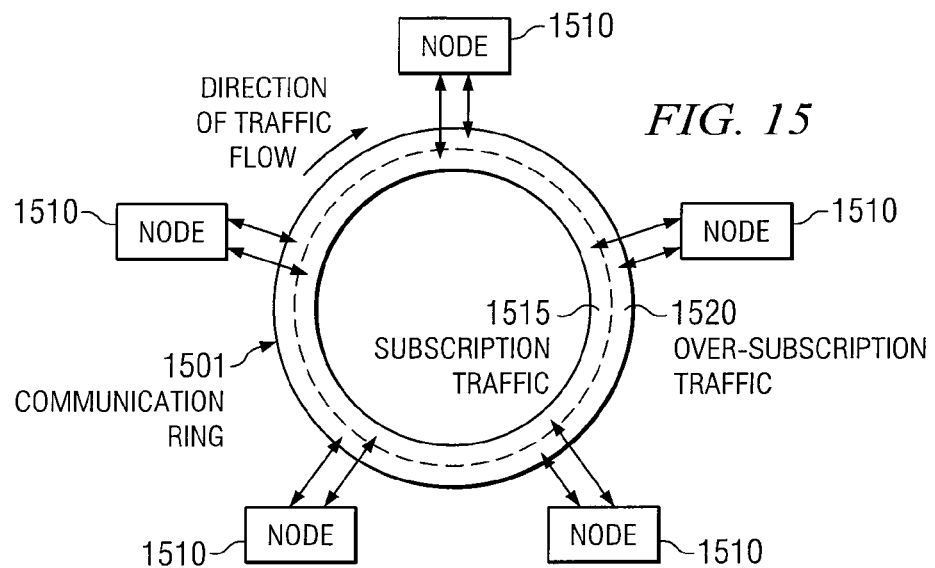
FIG. 15 is a diagram depicting an embodiment of the aspect of the present invention for dynamic bandwidth sharing on a communication ring where the ring bandwidth is divided into two categories.

Embodiments of the present invention for dynamic bandwidth sharing on a communication ring facilitates the sharing of bandwidth between multiple nodes on the ring. In various embodiments, distances between nodes can range from worldwide scales to merely a few feet. FIG. 15 depicts Communication Ring 1501 whose bandwidth is divided into two categories: one for Subscription Traffic 1515 (also referred to as committed traffic) and one for Over-Subscription Traffic 1520. The percentage of ring bandwidth assigned to each type of traffic within the ring can be dynamically and automatically adjusted. Nodes 1510 transmit traffic to Communication Ring 1501 and receive traffic from Communication Ring 1501, as is known in the art. As depicted in FIG. 15, traffic flows around the ring in a single direction. The downstream direction from a node on a ring is the direction that traffic flows on the ring. The upstream direction from a node is the direction opposite the traffic flow. As is known in the art, bi-directional rings may be created by combining two single direction rings that transport traffic in opposite directions. Embodiments of the present invention for dynamic bandwidth sharing operate on single direction rings and may be employed separately on each single direction ring of a bidirectional ring.

Figure 16:
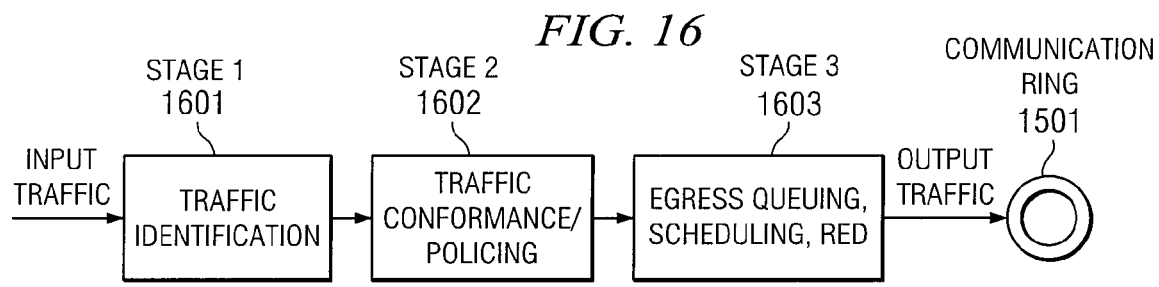
FIG. 16 is a diagram depicting the processing of traffic within a node in preparation for the insertion of the traffic onto a communication ring.

FIG. 16 depicts the typical processing of traffic before it is inserted onto a communication ring. Three stages may be employed at a node on a ring to process traffic so that the bandwidth on the ring can be assigned to various classes of traffic. As is known in the art, some classes of traffic, such as voice, may require rapid transmission, while other classes of traffic, such as bulk data, may be transmitted when convenient. The three stages depicted in FIG. 16 are:

Stage 1 1601 (Traffic Identification): Input traffic to the node for transmission onto the ring may be identified based on the traffic's origin, for example, its physical port address, Medium Access Control (MAC) address, Internet Protocol (IP) address, or Differentiated Services Code Point (DSCP), as are known in the art, to determine to what class the traffic belongs. For example, voice traffic may be classed as high priority while data traffic is classed as low priority. The processing speed at this stage is typically the same as the input line rate.

Stage 2 1602 (Traffic Conformance/Policing): After traffic identification, the traffic is switched to corresponding policing devices for conformance verification, for example, Peak Cell Rate (PCR), Sustainable Cell Rate (SCR) with normal burst, SCR with excess burst, and others as are known in the art. Based on traffic identification and conformance verification, portions of the traffic will be assigned to an egress queue or will be dropped, as is known in the art. At this stage, the processing speed is typically the same as the line rate.

Stage 3 1603 (Queuing/Scheduling and RED (Random Early Detection)): Traffic is queued in preparation for being inserted onto the communication ring. The length/depth and output bandwidth of each queue are assigned based on service definitions, e.g., throughput rate, delay time, loss probability, burst sizes, and number of customers to be served, as is known in the art. During this stage, as is known in the art, the traffic is smoothed using a scheduling system, e.g. weighted Round Robin (RR) queuing, priority queuing, or hierarchical queuing. In addition, RED is implemented to drop traffic in case the depth of a particular queue exceeds a predetermined threshold.

Figure 17:
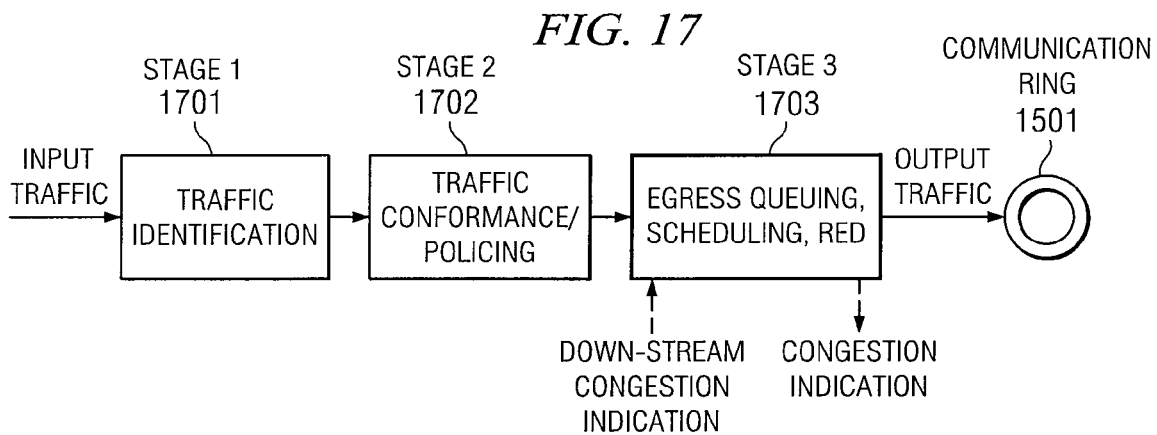
FIG. 17 is a diagram depicting an embodiment of the present invention for processing traffic within a node in preparation for the insertion of the traffic onto a communication ring.

FIG. 17 depicts embodiments of the present invention for traffic identification, traffic conformance/policing, egress queuing/scheduling, including, in some embodiments, congestion detection, and congestion indication to the upstream node on a communication ring. As depicted in FIG. 17, these embodiments of the present invention are generally structured in a similar manner to the traffic processing depicted in FIG. 16. The detailed operation of Stage 1 1701, Stage 2 1702, and Stage 3 1703 as depicted in FIG. 17 are described below in this Specification.

Embodiments of the present invention provide class-based queuing and congestion management that is not based on individual data flows or particular customers. These embodiments improve the scalability of the invention. In these embodiments, traffic is categorized into two main groups: subscription (committed) and over-subscription. In some embodiments, subscription traffic includes Constant Bit Rate (CBR) and Variable Bit Rate (VBR) with normal burst size, as are known in the art. In some embodiments, over-subscription traffic includes VBR with excess burst, nonconforming VBR traffic, e.g. exceeding the mean rate, and Unspecified Bit Rate (UBR), as are known in the art. A hybrid of weighted fairness and priority queuing/scheduling is employed in some embodiments as is known in the art. In some embodiments, all subscription traffic is sent to the ring before the rest of traffic. This helps to ensure that the loss and delay of subscription traffic is minimized during the periods of congestion. In addition, reserved bandwidth may be provided on the ring for subscription traffic. In these embodiments, over-subscription traffic is not permitted to jam subscription traffic. For excess burst traffic, a separate policing device is used as is known in the art.

Figure 18:
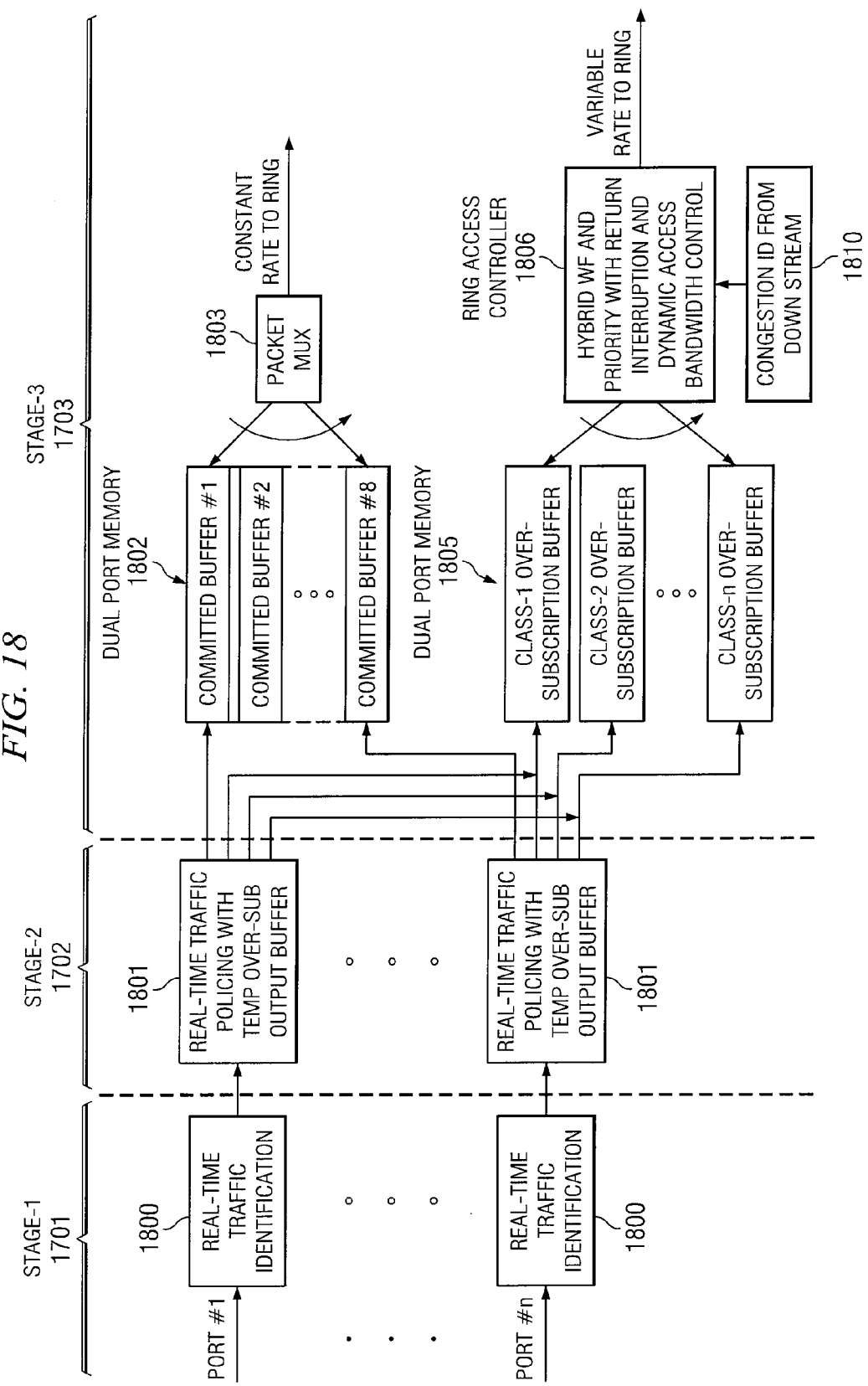
FIG. 18 is a block diagram depicting an embodiment of the present invention for processing traffic within a node in preparation for the insertion of the traffic onto a communication ring.

FIG. 18 is a block diagram depicting, in some embodiments of the present invention, three stages of processing traffic. In some embodiments, traffic is classified (as part of Stage 1 1701 processing by Real-time Traffic Identification 1800) and policed (as part of Stage 2 1702 processing by Real-time Traffic Policing with tem over-sub (temporary over-subscription) output buffer 1801) into two different dual-port memories: one for subscription traffic (as part of Stage 3 1703 processing using Dual Port memory 1802) and the other one for over-subscription traffic (as part of Stage 3 1703 processing using Dual Port memory 1805). Subscription traffic is sent out onto the communication ring by Packet MUX 1803 with priority over over-subscription traffic. Over-subscription traffic is sent out onto the communication ring by Ring Access Controller 1806, which takes into account congestion management.

In embodiments of the present invention, Stage 1 1701 performs the following functions, as are known in the art:

1. Creation and population of a traffic identification table for use in conformance verification and scheduling;

2. Real-time checking of the traffic's port address, Medium Access Control (MAC) address, IP address, or (Differentiated Services Code Point) DSCP code and determining the corresponding traffic carriage contract and parameters; and 3. Forwarding the traffic to the corresponding traffic policing system (Stage 2 1702) at the line rate.

Figures 19, 20:
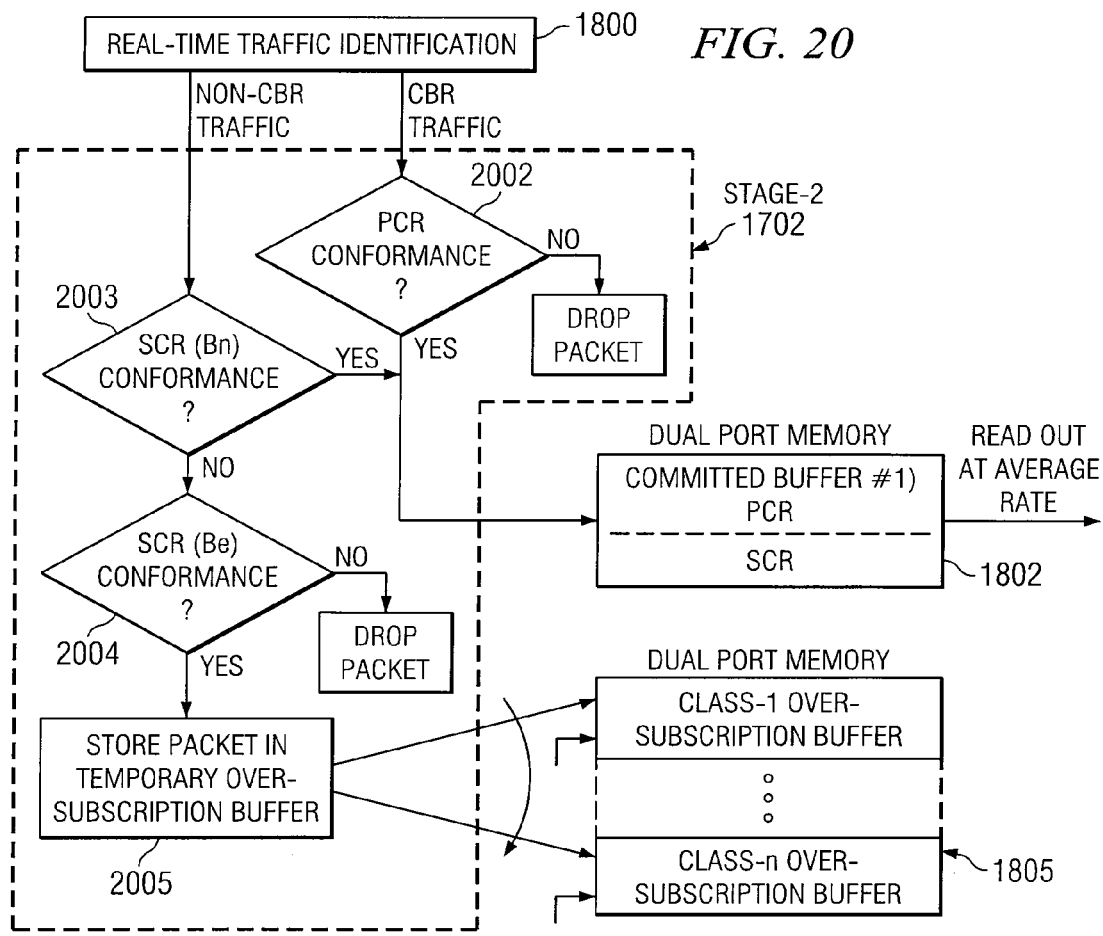
FIG. 19 is a table depicting an embodiment of a traffic identification table of the present invention for use in Stage 1 processing.
FIG. 20 is a block diagram depicting an embodiment of the present invention for conducting Stage 2 processing.

FIG. 19 depicts an example of a traffic identification table (Traffic Identification Table 1901), as is known in the art and in an embodiment of the present invention, generated during Stage 1 processing.

In embodiments of the present invention, as depicted in FIG. 20, traffic is policed based on Peak Rate, Normal Bandwidth (Bn), and Excess Bandwidth (Be), as is known in the art, in processing by Stage 2 1702. As is known in the art, other policing techniques may also be employed. Although the present invention can be used for TDM, packet, cell-based traffic, and other traffic, Peak Cell Rate (PCR) and Sustainable Cell Rate (SCR), as is known in the art, are depicted in FIG. 20 as an example. Stage 2 1702 operations to classify traffic, police traffic and store the traffic in the buffer are:

1. Stage 1 classification activities assign the traffic to different policing devices. In FIG. 20, for example and in this embodiment, three policing devices are used. Each policing device is set based on specific service contract requirements. For example, if there are three different PCR services, e.g. mean rates are 64 kb/s, 2 Mb/s, 4 Mb/s, then there will be three PCR buckets corresponding to these three services. In embodiments of the present invention, the number of policing devices should be equal to the number of services defined or offered by a service provider, rather than the number of physical ports or number of customers served by each node.

2. If the traffic passes PCR or VBR with normal burst size, as is known in the art, the traffic is sent to a committed buffer in Dual Port memory 1802 at the line rate. In embodiments of the present invention, there is one committed buffer for each physical port, and there is therefore no need for a temporary buffer for the committed traffic.

3. As depicted in FIG. 20, only the excess burst traffic is shown as over-subscription traffic. In some embodiments, the non-conforming traffic would be included as over-subscription traffic and put into a different class of egress queue, as is known in the art.

4. For over-subscription traffic, in the depicted embodiment, there is a temporary buffer (2005) for each physical port. This is because over-subscription traffic is stored based on classes of services. Traffic belonging to the same class but different input ports will be stored in the same queue.

5. In embodiments of the present invention, the required depth of the temporary over-subscription buffer (2005) is determined, as is known in the art, by acceptable excess burst size and the probability of accessing the corresponding Class-n over-subscription buffer (contained in Dual Port memory 1805).

6. In embodiments of the present invention, the read-out rate of the internal temporary buffer (2005) is equal to or greater than the average rate of acceptable excess burst.

7. In some embodiments, the protocol to move packets from the temporary over-subscription buffer (2005) to the Class-n over-subscription buffer (contained in Dual Port memory 1805) is based on a request from the temporary over-subscription buffer (2005) or any Class-n over-subscription buffer (contained in Dual Port memory 1805).

Figure 21:
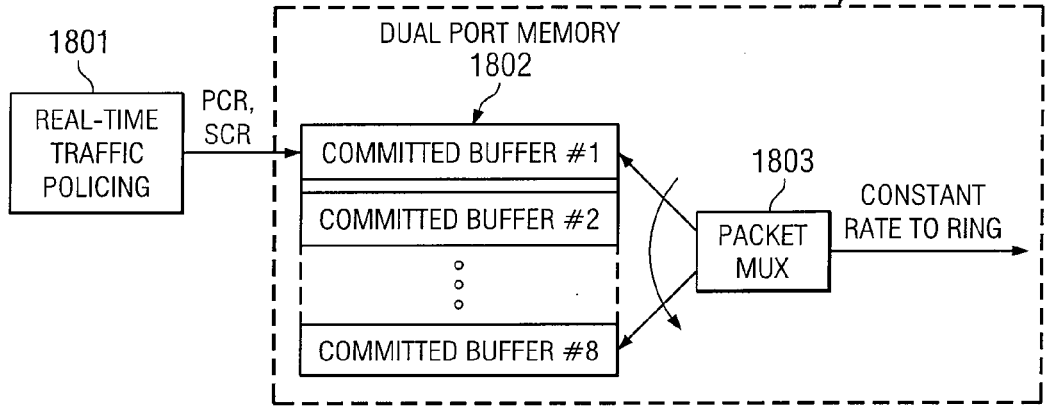
FIG. 21 is a block diagram depicting an embodiment of the present invention for conducting Stage 3 processing on committed (also referred to as subscription) traffic.

FIG. 21 depicts, in some embodiments of the present invention, the Stage 3 operations where committed traffic is processed and multiplexed onto the ring. In these embodiments, Stage 3 performs the following operations on committed traffic:

1. The committed buffers can be implemented as one memory (Dual Port memory 1802) shared by all the physical ports or in one-to-one correspondence to each physical port with a buffer depth that supports at least one maximum acceptable burst size from each physical port, as is known in the art.

2. If, in some embodiments, all the packets coming to the committed buffers have a fixed length, i.e. Segmentation and Reassembly (SAR) is implemented in the traffic classification block, as is known in the art, then the buffer is temporary storage for waiting until it is emptied by Packet MUX 1803.

3. In embodiments of the present invention, Packet MUX 1803 ensures that there is no interleaving between packets coming from the same input port, if there is no SAR message Identification (ID), as is known in the art.

4. In embodiments of the present invention, the output rate of Packet MUX 1803 will be the sum of all committed traffic. In these embodiments, there is a corresponding bandwidth reserved on the ring and Packet MUX 1803 behaves in a similar manner to a RR multiplexor with pre-assigned bandwidth for each committed buffer, as is known in the art.

Figure 22:
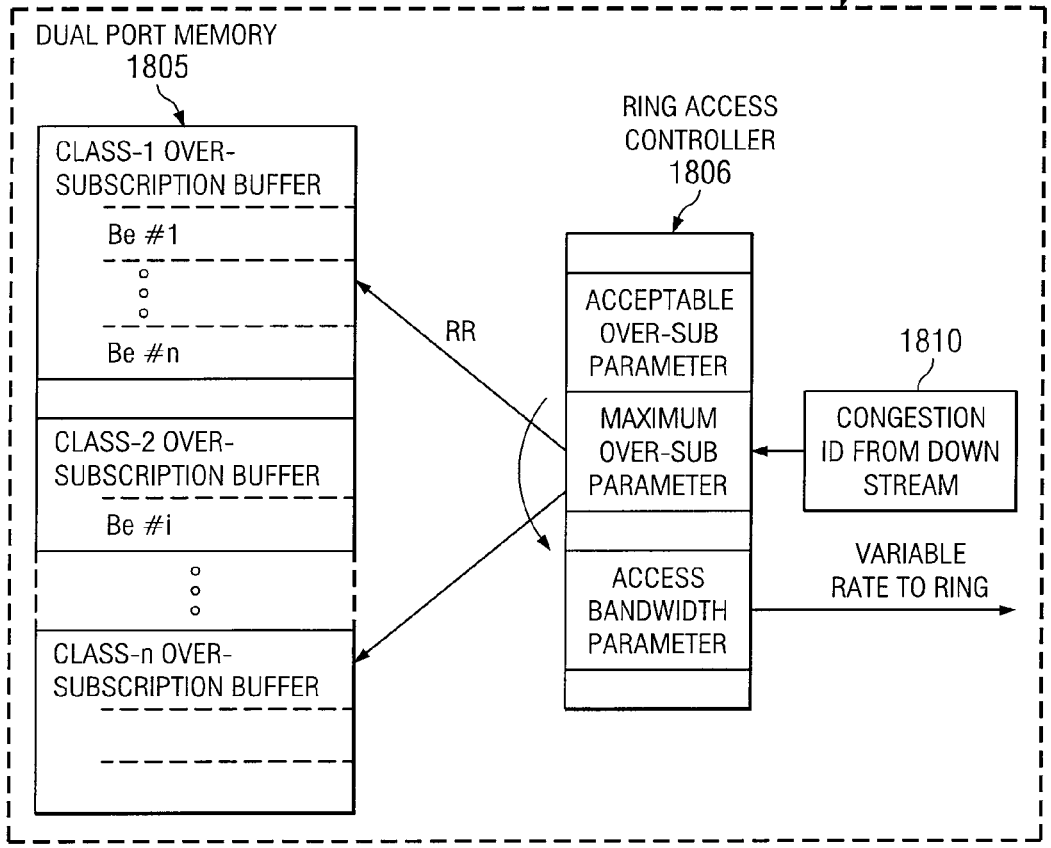
FIG. 22 is a block diagram depicting an embodiment of the present invention for conducting Stage 3 processing on over-subscription traffic.

In embodiments of the present invention, FIG. 22 depicts the Stage 3 operations where over-subscription traffic is processed. In these embodiments, Stage 3 performs the following operations on over-subscription traffic:

1. In some embodiments, the operation of Ring Access Controller 1806 is a hybrid of Weighted Fair (WF) and priority through the use of a return interruption mechanism, as is known in the art. Ring Access Controller 1806 uses WF to first read data out of the Class-1 over-subscription buffer, contained in Dual Port memory 1805, at a predetermined rate, then to read data out of the next Class-2 over-subscription buffer, contained in Dual Port memory 1805, at another predetermined rate, and then continues in a like manner through the rest of the over-subscription buffers. The predetermined rates provide every class with a fair amount of ring access bandwidth, i.e. weighted fairness as is known in the art. This technique is a work-conserving discipline, i.e. if the buffer is empty in a class, then the technique proceeds to the next class. In some embodiments, at periodic, predetermined time intervals, Ring Access Controller 1806 returns to the Class-1 over-subscription buffer and proceeds with data read-out as just described. In alternative embodiments, Ring Access Controller 1806 returns to the Class-1 over-subscription buffer immediately after all of the other over-subscription buffers have been read-out.

2. In some embodiments, a Maximum Over-Subscription Bandwidth and an Acceptable Over-Subscription Bandwidth are assigned to each node for use by Ring Access Controller 1806. In these embodiments, when Ring Access Controller 1806 is initialized, the node's Access Bandwidth is set equal to the node's Maximum Over-Subscription Bandwidth. The maximum ring over-subscription bandwidth available to a node and actually used by the node at a particular time is the node's actual Over-Subscription Bandwidth. When the actual Over-Subscription Bandwidth is sufficient to service all of the over-subscription buffers at their predetermined rates, Ring Access Controller 1806 operates in a RR fashion as is known in the art. When the actual Over-Subscription Bandwidth is not sufficient to service all of the over-subscription buffers at their predetermined rates, then the lower priority classes may not be read-out, and Ring Access Controller 1806 acts as a priority queue and may, in some embodiments, activate RED for certain classes of over-subscription buffers and employ return interruption as is known in the art. In these embodiments, predetermined rates assigned to the over-subscription buffers are not changed and each class may be served or not served.

3. In some embodiments, if Ring Access Controller 1806 experiences Congestion, then Ring Access Controller 1806 will send a congestion signal to all of the nodes on the ring including its own node. Ring Access Controller 1806 will send additional congestion signals at predetermined intervals until the Congestion is cleared. In some embodiments, the congestion signal will include the time and node at which Congestion occurred. When the Congestion is cleared, Ring Access Controller 1806 will send a congestion cleared signal to all of the nodes on the ring including itself. In some embodiments, the congestion cleared signal will include the time and node at which the Congestion cleared condition occurred.

4. In some embodiments, each time a congested signal is received by a node, Ring Access Controller 1806 will adjust node's Access Bandwidth in accordance with the formula:

Access Bandwidth=($N_i$/Total number of nodes)×(Maximum Over-Subscription Bandwidth−Acceptable Over-Subscription Bandwidth)×(½exp $n$)×($N_r$)+Acceptable Over-Subscription Bandwidth.

Where:

| | |
|---|---|
| $N_i$: | the ith up-stream node from the node that originated the congested signal; the value of Ni can be predefined during service provisioning time, for example and in some embodiments, N1 is equal to 1, N2 is equal to 2, and so on in a linear fashion. |
| $n$: | the nth time receiving the congestion indication without receiving an intervening congestion cleared signal, e.g. the first time (1/2exp 1) = ½, the second time (1/2exp 2) = ¼, the third time (1/2exp 3) = ⅛, and so on. |
| $N_r$: | a random number, (a number for example between 1.5 and 0.5) |

5. In some embodiments, each time a congestion cleared signal is received by a node, Ring Access Controller 1806 will adjust node's Access Bandwidth in accordance with the formula:

Access Bandwidth=(Maximum Over-Subscription Bandwidth−Access Bandwidth)×($n$ /$N_r$)+Access Bandwidth.

Where:

$N_r$ is an integer random number, for example and in some embodiments, an integer between 4 and 8. This random number is generated for a particular node when the congestion cleared signal is received; and n is reset to 1 each time a congestion cleared signal is received and, so long as no congestion signal is received, is incremented at predetermined periodic intervals after the congestion cleared signal is received until n equals Nr. Each time n is incremented, the Access Bandwidth is recalculated.

Figure 23:
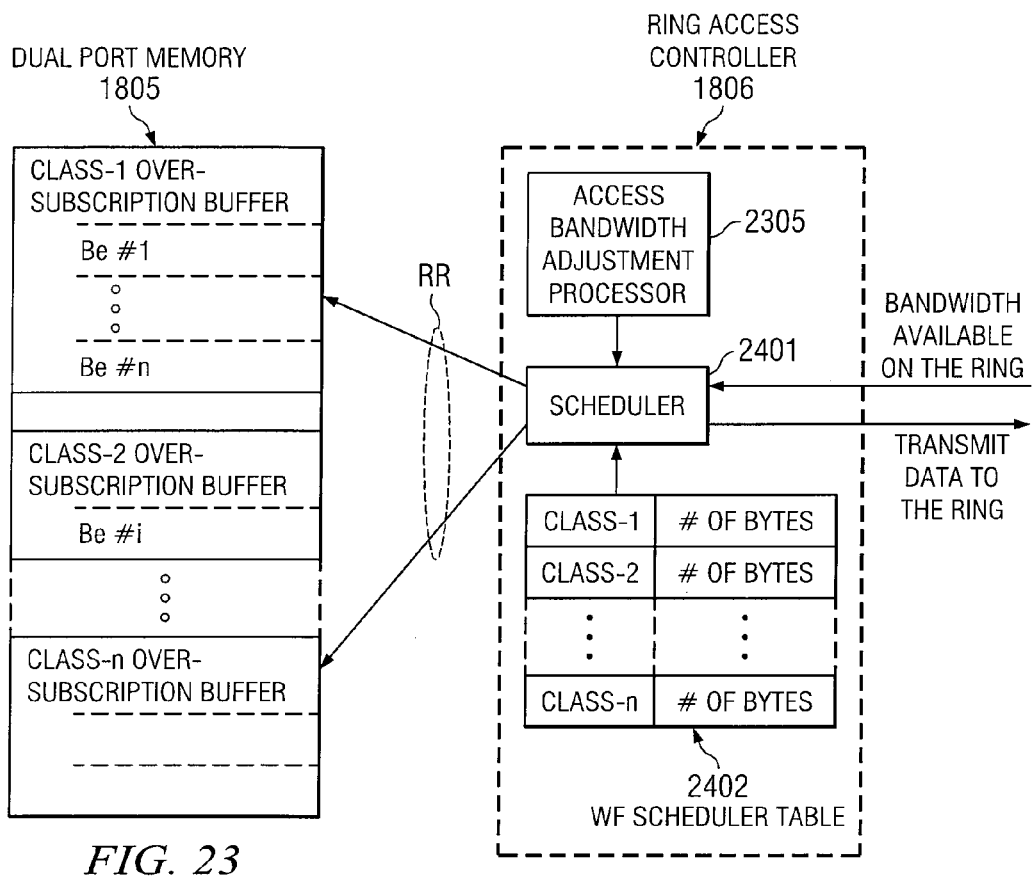
FIG. 23 is a block diagram depicting the use of a weighted fair scheduler in an embodiment of the present invention for dynamic congestion control.

In some embodiments, and as an example, FIG. 23 depicts a weighted fair scheduler table (WF Scheduler table 2402) used as the database for Scheduler 2401, as is known in the art, to determine which traffic from Dual Port memory 1805 should be read and sent to the ring.

Figure 24:
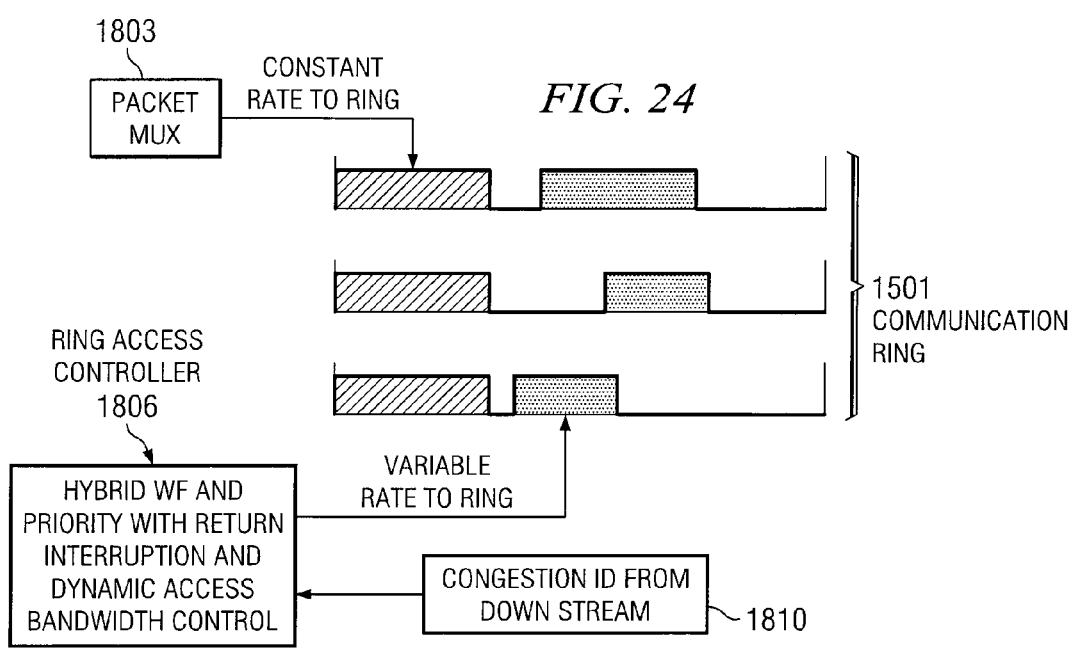
FIG. 24 is a block diagram depicting the multiplexing of the committed traffic and over-subscription traffic onto a communication ring in an embodiment of the present invention.

FIG. 24 depicts, for some embodiments, the multiplexing of committed traffic and over-subscription traffic onto the ring. The committed bandwidth is forwarded onto the ring at a predetermined constant rate by Packet MUX 1803 and is processed before over-subscription traffic. Over-subscription traffic is forwarded into the ring by Ring Access Controller 1806 at a variable rate based on available bandwidth.

It should be understood that the preceding is merely a detailed description of some examples and embodiments of this invention and that numerous changes to the disclosed embodiments can be made in accordance with the disclosure herein without departing from the spirit or scope of the invention. The preceding description, therefore, is not meant to limit the scope of the invention.

I claim:

1. A method for transporting data, comprising:

transmitting, through a Synchronized Packet-Based Trunk, data to a communication ring, wherein the communication ring employs Dynamic Bandwidth Sharing, wherein the data is transmitted in different packet formats, the different packet formats separately transmitting signaling data, synchronous data, and asynchronous data; and transporting the data through the communication ring, wherein the bandwidth of the communication ring is divided into Subscription Bandwidth for each node on the communication ring and Over-Subscription Bandwidth shared by all nodes on the communication ring.

2. A method for transporting data, comprising:

transporting data through a communication ring employing Dynamic Bandwidth Sharing, wherein the bandwidth of the communication ring is divided into Subscription Bandwidth for each node on the communication ring and Over-Smubscription Bandwidth shared by all nodes on the communication ring; and receiving, through a Synchronized Packet-Based Trunk, the data from the communication ring, wherein the data is received in different packet formats, the different packet formats separately transmitting signaling data, synchronous data, and asynchronous data.

3. A Synchronized Packet-Based Trunk method for transporting data, comprising:

transmitting a Frame Synchronization. Packet through a communication channel at the beginning of a Frame Cycle, wherein the Frame Cycle has a predetermined duration;

accumulating a set of synchronous data;

accumulating a set of asynchronous data;

transmitting the set of synchronous data through the communication channel during the Frame Cycle; and transmitting a portion of the set of asynchronous data through the communication channel during the Frame Cycle, wherein the portion is selected responsive to the size of the Frame Synchronization Packet, the size of the transmitted set of synchronous data, and the duration of the Frame Cycle.

4. The Synchronized Packet-Based Trunk method for transporting data of claim 3, wherein the transmitted set of synchronous data is transmitted in at least one TDM Packet.

5. The Synchronized Packet-Based Trunk method for transporting data of claim 3, wherein the transmitted portion of asynchronous data is transmitted in at least one Asynchronous Data Packet.

6. A Dynamic Bandwidth Sharing method for regulating bandwidth on a communication ring, comprising:

assigning a Subscription Bandwidth for each of a plurality of nodes on the communication ring, the Subscription Bandwidth being an amount of bandwidth guaranteed to be reserved on the communication ring for each node;

assigning an Over-Subscription Bandwidth for the communication ring, the Over-Subscription Bandwidth being an amount of bandwidth on the communication ring not being assigned as Subscription Bandwidth, the Over-Subscription Bandwidth being shared by all the nodes on the communication ring;

assigning, to each node, a Maximum Over-Subscription Bandwidth based on the Over-Subscription Bandwidth for the communication ring;

setting, at each node, an Access Bandwidth, wherein the Access Bandwidth is initially equal to the Maximum Over-Subscription Bandwidth, the Access Bandwidth being the actual Maximum Over-Subscription Bandwidth at a particular time;

adjusting, at a particular node, the Access Bandwidth after the particular node receives a congestion signal; and adjusting, at the particular node, the Access Bandwidth after the particular node receives a congestion cleared signal.

7. The Dynamic Bandwidth Sharing method for regulating bandwidth on a communication ring of claim 6, further comprising assigning, to each node of the plurality of nodes, an Acceptable Over-Subscription Bandwidth; and wherein the Access Bandwidth of the particular node is not adjusted to a value less than the Acceptable Over-Subscription Bandwidth of particular node.

8. The Dynamic Bandwidth Sharing method for regulating bandwidth on a communication ring of claim 7, wherein adjusting the Access Bandwidth after the particular node receives a congestion signal is responsive to the position of the particular node in the communication ring, a randomizing process, a duration of Congestion, the Acceptable Over-Subscription Bandwidth, and the Maximum Over-Subscription Bandwidth.

9. The Dynamic Bandwidth Sharing method for regulating bandwidth on a communication ring of claim 6, wherein adjusting the Access Bandwidth after the particular node receives a congestion signal is responsive to the position of the particular node in the communication ring.

10. The Dynamic Bandwidth Sharing method for regulating bandwidth on a communication ring of claim 6, wherein adjusting the Access Bandwidth after the particular node receives a congestion signal is responsive to a randomizing process.

11. The Dynamic Bandwidth Sharing method for regulating bandwidth on a communication ring of claim 6 wherein adjusting the Access Bandwidth after the particular node receives a congestion cleared signal is performed at predetermined intervals until the Access Bandwidth is adjusted to a value equal to the Maximum Over-Subscription Bandwidth for the particular node.

12. The Dynamic Bandwidth Sharing method for regulating bandwidth on a communication ring of claim 6, wherein adjusting the Access Bandwidth after the particular node receives a congestion cleared signal is responsive to a randomizing process.

13. The Dynamic Bandwidth Sharing method for regulating bandwidth on a communication ring of claim 6, further comprising generating, at the particular node and responsive to Congestion at the particular node, the congestion signal.

14. The Dynamic Bandwidth Sharing method for regulating bandwidth on a communication ring of claim 6, further comprising generating, at the particular node and responsive to clearing Congestion at the particular node, the congestion cleared signal.

15. An apparatus for transporting data, comprising:

means for transmitting, through a Synchronized Packet-Based Trunk, data to a communication ring, wherein the communication ring employs Dynamic Bandwidth Sharing, wherein the data is transmitted in different packet formats, the different packet formats separately transmitting signaling data, synchronous data, and asynchronous data; and means for transporting the data through the communication ring, wherein the bandwidth of the communication ring is divided into Subscription Bandwidth for each node on the communication ring and Over-Subscription Bandwidth shared by all nodes on the communication ring.

16. An apparatus for transporting data, comprising:

means for transporting data through a communication ring employing Dynamic Bandwidth Sharing, wherein the bandwidth of the communication ring is divided into Subscription Bandwidth for each node on the communication ring and Over-Subscription Bandwidth shared by all nodes on the communication ring; and means for receiving, through a Synchronized Packet-Based Trunk, the data from the communication ring, wherein the data is received in different packet formats, the different packet formats separately transmitting signaling data, synchronous data, and asynchronous data.

17. A Synchronized Packet-Based Trunk apparatus for transporting data, comprising:

means for transmitting a Frame Synchronization Packet through a communication channel at the beginning of a Frame Cycle, wherein the Frame Cycle has a predetermined duration;

means for accumulating a set of synchronous data;

means for accumulating a set of asynchronous data;

means for transmitting the set of synchronous data through the communication channel during the Frame Cycle; and means for transmitting a portion of the set of asynchronous data through the communication channel during the Frame Cycle, wherein the portion is selected responsive to the size of the Frame Synchronization Packet, the size of the transmitted set of synchronous data, and the duration of the Frame Cycle.

18. The Synchronized Packet-Based Trunk apparatus for transporting data of claim 17, wherein the transmitted set of synchronous data is transmitted in at least one TDM Packet.

19. The Synchronized Packet-Based Trunk apparatus for transporting data of claim 17, wherein the transmitted portion of asynchronous data is transmitted in at least one Asynchronous Data Packet.

20. A Dynamic Bandwidth Sharing apparatus for regulating bandwidth on a communication ring, comprising:

means for assigning a Subscription Bandwidth for each of a plurality of nodes on the communication ring, the Subscription Bandwidth being an amount of bandwidth guaranteed to be reserved on the communication ring for each node;

means for assigning an Over-Subscription Bandwidth for the communication ring, the Over-Subscription Bandwidth being an amount of bandwidth on the communication ring not being assigned as Subscription Bandwidth, the Over-Subscription Bandwidth being shared by all the nodes on the communication ring;

means for assigning, to each node, a Maximum Over-Subscription Bandwidth based on the Over-Subscription Bandwidth for the communication ring;

means for setting, at each node, an Access Bandwidth, wherein the Access Bandwidth is initially equal to the Maximum Over-Subscription Bandwidth, the Access Bandwidth being the actual Maximum Over-Subscription Bandwidth at a particular time;

means for adjusting, at a particular node, the Access Bandwidth after the particular node receives a congestion signal; and means for adjusting, at the particular node, the Access Bandwidth after the particular node receives a congestion cleared signal.

21. The Dynamic Bandwidth Sharing apparatus for regulating bandwidth on a communication ring of claim 20, further comprising means for assigning, to each node of the plurality of nodes, an Acceptable Over-Subscription Bandwidth; and wherein the Access Bandwidth of the particular node is not adjusted to a value less than the Acceptable Over-Subscription Bandwidth of the particular node.

22. The Dynamic Bandwidth Sharing apparatus for regulating bandwidth on a communication ring of claim 21, wherein adjusting the Access Bandwidth after the particular node receives a congestion signal is responsive to the position of the particular node in the communication ring, a randomizing process, a duration of Congestion, the Acceptable Over-Subscription Bandwidth, and the Maximum Over-Subscription Bandwidth.

23. The Dynamic Bandwidth Sharing apparatus for regulating bandwidth on a communication ring of claim 20, wherein the means for adjusting the Access Bandwidth after the particular node receives a congestion signal is responsive to the position of the particular node in the communication ring.

24. The Dynamic Bandwidth Sharing apparatus for regulating bandwidth on a communication ring of claim 20, wherein the means for adjusting the Access Bandwidth after the particular node receives a congestion signal is responsive to a randomizing process.

25. The Dynamic Bandwidth Sharing apparatus for regulating bandwidth on a communication ring of claim 20, wherein the means for adjusting the Access Bandwidth after the particular node receives a congestion cleared signal is invoked at predetermined intervals until the Access Bandwidth is adjusted to a value equal to the Maximum Over-Subscription Bandwidth for the particular node.

26. The Dynamic Bandwidth Sharing apparatus for regulating bandwidth on a communication ring of claim 20, wherein the means for adjusting the Access Bandwidth after the particular node receives a congestion cleared signal is responsive to a randomizing process.

27. The Dynamic Bandwidth Sharing apparatus for regulating bandwidth on a communication ring of claim 20, further comprising means for generating, at the particular node and responsive to Congestion at the particular node, the congestion signal.

28. The Dynamic Bandwidth Sharing apparatus for regulating bandwidth on a communication ring of claim 20, further comprising means for generating, at the particular node and responsive to clearing Congestion at the particular node, the congestion cleared signal.

* * * * *